(12) United States Patent
Tomlyn

(10) Patent No.: US 7,703,028 B2
(45) Date of Patent: Apr. 20, 2010

(54) MODIFYING THE GRAPHICAL DISPLAY OF DATA ENTITIES AND RELATIONAL DATABASE STRUCTURES

(75) Inventor: Craig R. Tomlyn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 10/319,056

(22) Filed: Dec. 12, 2002

(65) Prior Publication Data

US 2004/0113942 A1  Jun. 17, 2004

(51) Int. Cl.
- G06F 3/00 (2006.01)
- G06F 9/00 (2006.01)
- G06F 17/00 (2006.01)

(52) U.S. Cl. ............... 715/764; 715/765; 715/762; 345/440; 345/440.1

(58) Field of Classification Search .......... 345/440, 345/440.1, 804; 715/762, 764, 765
See application file for complete search history.

(56) References Cited

U.S. PATENT DOCUMENTS

| | | | |
|---|---|---|---|
| 5,889,520 A | 3/1999 | Glaser | ............. 345/349 |
| 5,933,831 A | 8/1999 | Jorgensen | |
| 5,986,673 A | 11/1999 | Martz | |
| 6,144,962 A | 11/2000 | Weinberg et al. | |
| 6,161,103 A | 12/2000 | Rauer et al. | |
| 6,167,396 A | 12/2000 | Lokken | ................ 707/3 |
| 6,205,447 B1 * | 3/2001 | Malloy | ............. 707/102 |
| 6,353,452 B1 | 3/2002 | Hamada et al. | |
| 6,363,353 B1 | 3/2002 | Chen | |
| 6,418,428 B1 | 7/2002 | Bosch et al. | |
| 6,448,985 B1 * | 9/2002 | McNally | ............. 715/784 |
| 6,466,239 B2 * | 10/2002 | Ishikawa | ............ 715/850 |
| 6,473,102 B1 | 10/2002 | Rodden et al. | ............. 345/788 |
| 6,480,194 B1 | 11/2002 | Sang'udi et al. | |
| 6,496,204 B1 | 12/2002 | Nakamura | |
| 6,502,102 B1 | 12/2002 | Haswell et al. | |
| 6,581,068 B1 | 6/2003 | Bensoussan et al. | |
| 6,801,229 B1 | 10/2004 | Tinkler | |
| 6,823,495 B1 | 11/2004 | Vedula et al. | |

(Continued)

FOREIGN PATENT DOCUMENTS

CN    1268709    10/2000

(Continued)

OTHER PUBLICATIONS

Microsoft Excel 2000; ExoTips from Exomedia: http://www.exomedia.ca/resources/exotips_excel.cfm.*

(Continued)

*Primary Examiner*—Tadesse Hailu
*Assistant Examiner*—Anita Datta Chaudhuri
(74) *Attorney, Agent, or Firm*—Janaki K. Davda; Konrad Raynes & Victor LLP

(57) ABSTRACT

Systems, methods, and computer products that efficiently present large amounts of entity information with a graphical display that retains all or most of the relevant contextual information. More particularly, the preferred embodiment of the present invention enables efficient analysis of data with a graphical display that minimizes distortion of the text in the graphical display, that retains contextual information associated with data objects in the graphical display, and that positions the objects to optimally represent relational database associations.

54 Claims, 8 Drawing Sheets

U.S. PATENT DOCUMENTS

| | | | |
|---|---|---|---|
| 6,831,668 | B2 | 12/2004 | Cras et al. |
| 6,944,830 | B2 * | 9/2005 | Card et al. ................ 715/853 |
| 7,007,029 | B1 | 2/2006 | Chen |
| 2002/0059272 | A1 * | 5/2002 | Porter ........................ 707/100 |
| 2002/0070953 | A1 | 6/2002 | Barg et al. |
| 2002/0085041 | A1 * | 7/2002 | Ishikawa ................... 345/804 |
| 2002/0118214 | A1 * | 8/2002 | Card et al. ................. 345/619 |
| 2002/0124082 | A1 * | 9/2002 | San Andres et al. ........ 709/225 |
| 2002/0194167 | A1 * | 12/2002 | Bakalash et al. ............... 707/3 |
| 2003/0001869 | A1 * | 1/2003 | Nissen ....................... 345/672 |
| 2003/0084059 | A1 | 5/2003 | Kelly et al. ................. 707/102 |
| 2003/0134599 | A1 * | 7/2003 | Pangrac et al. ............. 455/67.4 |
| 2003/0163461 | A1 | 8/2003 | Gudbjartsson et al. |
| 2003/0187712 | A1 * | 10/2003 | Arthus et al. .................. 705/9 |
| 2003/0187716 | A1 | 10/2003 | Lee |
| 2003/0225769 | A1 | 12/2003 | Chkodrov et al. |
| 2004/0034615 | A1 | 2/2004 | Thomson et al. ............... 707/1 |
| 2004/0064456 | A1 | 4/2004 | Fong et al. |
| 2004/0117379 | A1 | 6/2004 | Khatchatrian et al. |
| 2005/0015360 | A1 * | 1/2005 | Cras et al. ...................... 707/2 |
| 2005/0080802 | A1 | 4/2005 | Cras et al. |
| 2005/0086238 | A1 * | 4/2005 | Nevin, III ................... 707/100 |

FOREIGN PATENT DOCUMENTS

| | | |
|---|---|---|
| CN | 1340174 A | 3/2002 |
| JP | 10011599 | 1/1998 |
| JP | 63155260 | 6/1998 |
| WO | 0042532 | 7/2000 |
| WO | WO 00/42530 | 7/2000 |
| WO | WO 00/42532 | 7/2000 |
| WO | WO 2001/037120 A2 | 5/2001 |

OTHER PUBLICATIONS

Excel 2000 Screenshot.*

*Interactive Schema Diagram to Visually Represent Tables of Related Data and Meaningful Joins Between Tables,* IBM Technical disclosure Bulletin, vol. 33, No. 9, Feb. 1991, pp. 243-246.

*Visual Representation of Database Query Definition,* IBM Technical Disclosure Bulletin, vol. 33, No. 9, Feb. 1991, pp. 238-242.

Patent Cooperation Treaty, PCT International Search Report, date of Mailing Aug. 16, 2004, Applicant's File Reference, SVL020074, International Application No. PCT/GB 03/05300, Filed May 12, 2003. 2004.

Cover letter from Chinese Attorney, first page of Office Action issued by the Chinese Patent Office on Apr. 15, 2005, indicating date of office action and references cited and English translation of Office Action. Invention # 2003101197273.

PCT International Preliminary Examination Report, Date of Mailing Jun. 8, 2005, International Application No. PCT/GB 03/05300, International Filing Date: Dec. 5, 2003.

J Schieb and M Muller, "Das Windows NT 4 fur Workstations Buch", Sybex Verlag, Dusseldorf, Germany. 1996 ISBN 3-8155-0255-1, p. 290-292, English translation included.

Second Office Action in Chinese Patent Application No. 200310119727.3, issued by the Chinese Patent Office on Sep. 30, 2005 (translation attached).

EP Office Action, issued on May 22, 2006, for European Patent Application No. EP 03778589.6- 2201.

Schieb, J., and M. Muller, "Das Windows NT 4 fur Workstation Buch", Sybex Verlag, Dusseldorf, Germany, 1996, pp. 290-292 (Full English Translation).

J. Rujillo et al., "Designing Data Warehouses with OO Conceptual Models", Cover Feature, IEEE, Dec. 2001, pp. 66-75.

S. Chaudhuri et al., "Database Technology for Decision Support Systems", Cover Feature, IEEE, Dec. 2001, pp. 48-55.

"Logical Design in Data Warehouse", Oracle 9i Data Warehousing Guide, Release 2 (9.2) Part No. A96520-01 [online][retrieved Mar. 1, 2006] http://www.lc.leidenuniv.nl/awcourse/oracle/server.920/a96520/logical.htm.

C. Stolte et al., "Query, Analysis, and Visualization of Hierarchically Structured Data Using Polaris", Stanford Univ. 2002.

S.G. Eick, "New Visualization Techniques", ACM SIGGRAPH, vol. 34, No. 1, Feb. 2000, pp. 1-11 [online][retrieved Apr. 8, 2004] http://www.siggraph.org/publications/newsletter/v34n1/contributions/eick.html.

Burns, M., "Administering OLAP with SAS/Warehouse Administrator(TM)", Paper 123, [online], [Retrieved on May 4, 2007], retrieved from the Internet at <URL:http://www2.sas.com/proceedings/sugi24/Dataware/p123-24.pdf>, 12 pp.

Gucer, V., W. Crane, C. Molloy, S. Schubert, & R. Walker, "Introduction to Tivoli Enterprise Data Warehouse", IBM Corp. Redbooks, [online], May 2002, [Retrieved on May 4, 2007], retrieved from the Internet at <URL: http://www.redbooks.ibm.com/redbooks/pdfs/sg246607.pdf>, 31 pp.

Oracle Corp., "Using the OLAP Analytic Workplace", [online], 2002, [Retrieved on Jan. 15, 2007], retrieved from the Internet at <URL: http://www.oracle.com/technology/obe/obe9ir2/obe-dwh/olap/olap.htm?_template=/ocom/ . . . >, 32 pp.

Information Materials for IDS for U.S. Appl. No. 10/319,056 dated Jun. 24, 2009, 1 p.

Japanese Office Action, Jun. 2009, JPO Application No. 2004-558784, 3 pp.

Translation of Japanese Office Action, Jun. 2009, JPO Application No. 2004-558784, 3 pp.

Patent Abstract & Translation for JP10011599, published on Jan. 16, 1998, 50 pp.

Browning, D. and J. Mundy, "Data Warehouse Design Considerations", Microsoft SQL 2000 Technical Articles, [online], Dec. 2001, [retrieved on Sep. 15, 2007], retrieved from the Internet at <URL: http://msdn2.microsoft.com/en-us/library/Aa902672(SQL.80,d=printer)aspx>, 20 pp.

Colossi, N., W. Malloy, & B. Reinwald, "Relational Extensions for OLAP", IBM Systems Journal, vol. 41, No. 4, Nov. 8, 2002, pp. 714-731.

Lujan-Mora, S., "Multidimensional Modeling Using UML and XML", 2000, 8 pp.

Utting, K. and N. Yankelovich, "Context and Orientation in Hypermedia Networks", ACM Transactions on Information Systems, vol. 7, No. 1, Jan. 1989, pp. 58-84.

Abstract for JP63-155260, published Jun. 28, 1988, 1 p.

IDS Report, Oct. 21, 2009, from the Oct. 20, 2009 Office Action for JP2004-558784, 1 p.

Japanese Office Action and Translation of "Notice of Reasons for for Rejection", Oct. 20, 2009, for Application No. JP2004-558784, 4 pp.

* cited by examiner

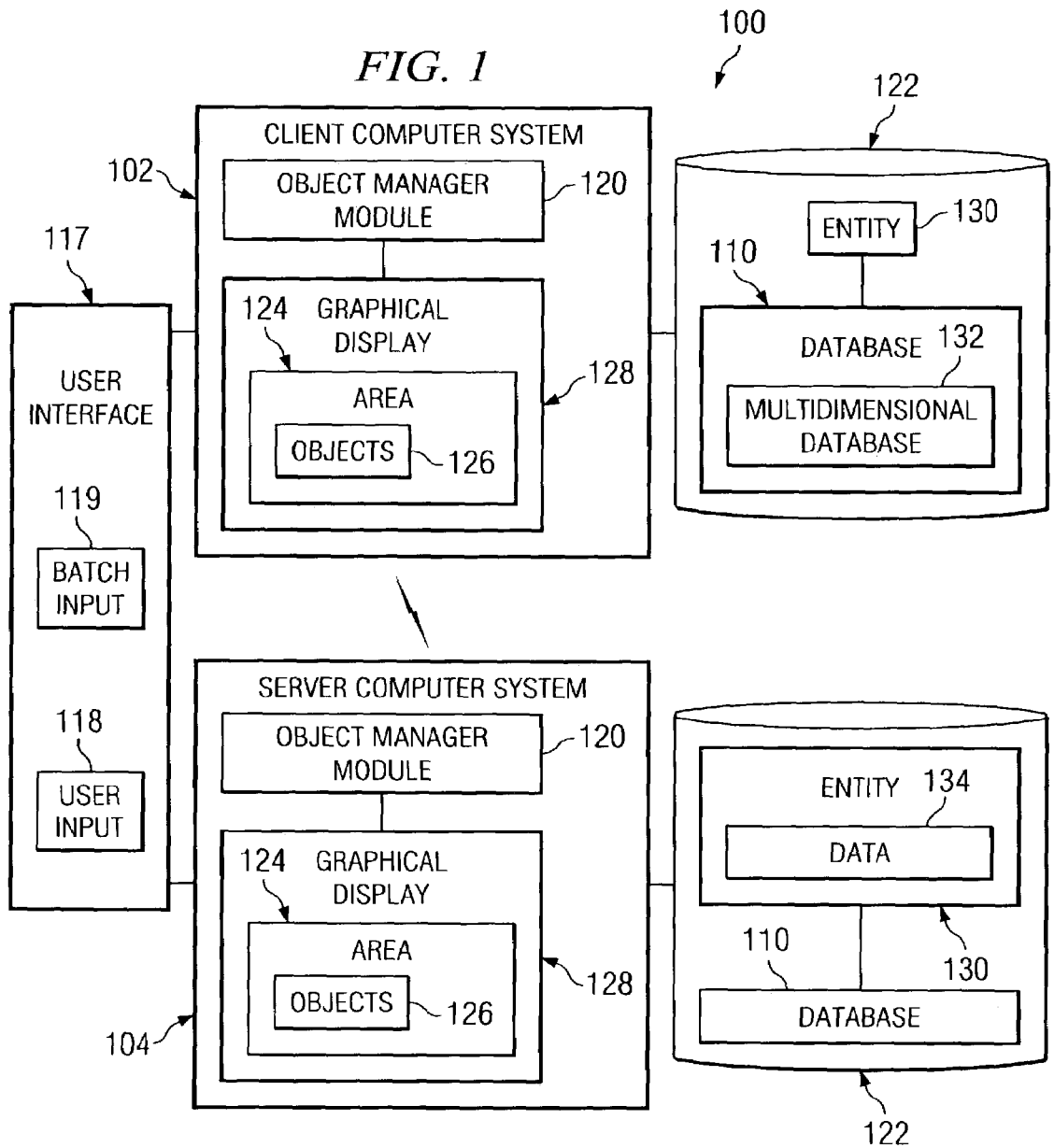
*FIG. 1*
*FIG. 2*
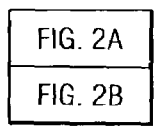

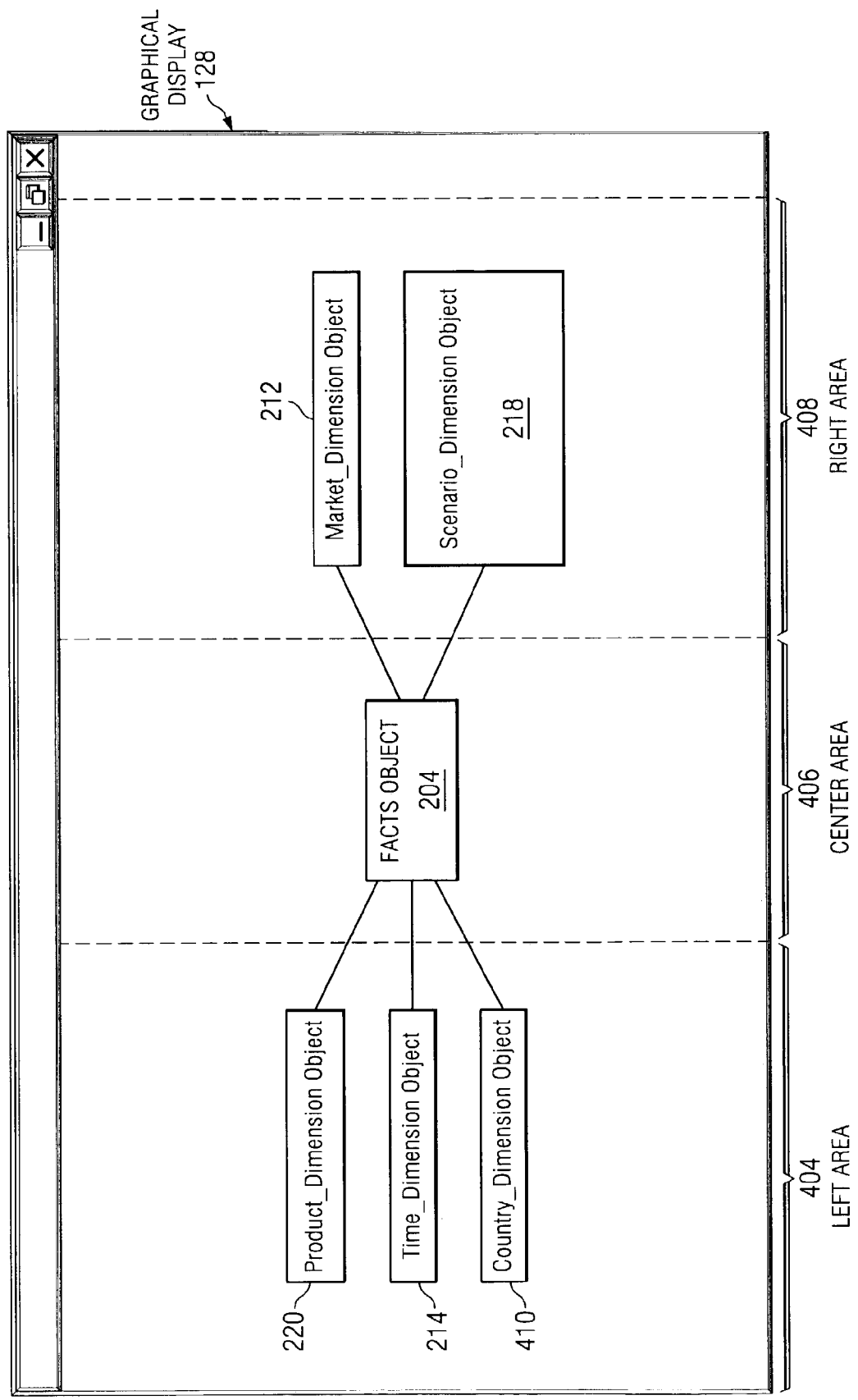

MODIFYING THE GRAPHICAL DISPLAY OF DATA ENTITIES AND RELATIONAL DATABASE STRUCTURES

CROSS-REFERENCE TO RELATED APPLICATION

In co-pending application Ser. No. 10/318,749 entitled "Systems, Methods, and Computer Program Products to Manage the Graphical Display of Data Entities and Relational Database Structures," filed on the same date herewith, by Khatchatrian, et al., assigned to the assignee of the present invention, and incorporated herein in its entirety by this reference, there is described a method of novelly describing and displaying relational database tables and their relationships to OLAP entities. Although not limited thereto, the present invention employs such a method in one of its preferred embodiments.

BACKGROUND OF THE INVENTION

1. Field of the Invention

The present invention is directed to the field of graphical displays of database information. It is more particularly directed to efficiently modifying the graphical display of a typically large number of data objects.

2. Description of the Background Art

A computer-implemented database is a collection of data, organized in the form of tables. A table typically consists of columns that represent data of the same nature, and records that represent specific instances of data associated with the table. A relational database is a database that may be a set of tables containing information that is manipulated in accordance with the relational model associated with the data. The product marketed under the trademarks IBM DB2 stores the data associated with the database in tables, and each table has a name.

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise, such as a corporation, through rapid access to a wide variety of data dimensions that are organized to reflect the multidimensional nature of enterprise data, typically by means of hypotheses about possible trends in the data. More particularly, OLAP techniques may be used to analyze data from different viewpoints by identifying interesting associations in the information in a database. Therefore, OLAP is a decision support technique used in data management for the purpose of modeling and analyzing business information.

An increasingly popular data model for OLAP applications is the multidimensional database (MDDB). Often, data analysts use MDDBs during interactive exploration of business data for finding regions of anomalies in the data. Before this data can be explored, modeling needs to be enabled for the business. Modeling a business for an OLAP application may require typically large amounts of metadata including data entities.

In the past graphics tools have used objects, such as rectangle displays, to represent data entities, such as relational database tables and OLAP data. The objects are displayed so that they present the relationships between the data contained in the relational database tables and between the OLAP data. It is useful to represent these data entities with as much contextual information as possible to enhance the presentation of the data for use in data modeling and analysis. Given the large amount of OLAP data associated with databases, such as multidimensional databases and relational databases, there may be many objects in the graphical representation. Further, the objects may be manipulated by techniques such as enlarging, minimizing, and moving the objects within the graphical display during creation and manipulation of the business data model. Some of the problems caused by object manipulation during the analysis of the data entities in a graphical display are that representations of the objects may be obscured or difficult to read, and that the contextual reference of the objects may be lost.

For example, scrolling of the graphical display windows typically associated with the presentation of the objects allows other objects to be viewed but has the disadvantage of losing the contextual reference for some of the objects. That is, during scrolling some of the objects may not be visible to the user, thereby losing the contextual reference of those objects. Also, zooming out operations to enable viewing of more objects in the graphical display typically results in the indiscriminate reduction in the size of individual objects. This has the disadvantage that the text within the individual objects is typically rendered too small to read so that the user must repeatedly zoom in to see details of the objects and zoom out to view the contextual relationship of the objects.

Yet another example of the difficulty of managing the graphical display of a large number of data entities occurs when the user is allowed to move the objects thereby enabling flexibility in graphical display but having the disadvantage that the user must constantly reposition the objects as they are expanded and minimized. For example, when a large number of objects are moved, typically one or more of the moved objects obscures the display of other objects thereby reducing contextual information on the graphical display. This type of operation also may require the user to iteratively expand and minimize objects to maintain the information about the contextual relationship of the moved objects.

It would therefore be useful to be able to efficiently analyze typically large amounts of entity information with a graphical display that retains all or most of the relevant contextual information and minimizes distortion of the graphical display. More particularly, when employing OLAP processing techniques that manipulate objects it would be useful to be able to efficiently analyze multidimensional data with a graphical display that minimizes the disadvantages associated with current graphical displays. From the foregoing it will be apparent that there is still a need to improve the graphical display of a typically large number of objects to retain contextual information and minimize graphical display distortion thereby enhancing analysis of the objects and the associated data by techniques such as data mining of relational database information and OLAP data.

SUMMARY OF THE INVENTION

An embodiment of the present invention relates to systems, methods, and computer products that efficiently present typically large amounts of entity information in a graphical display that retains all or most of the relevant contextual information about the entities. More particularly, the preferred embodiment of the present invention enables efficient analysis of data with a graphical display that improves data analysis by minimizing distortion of the text in the graphical display, retaining contextual information associated with data objects in the graphical display, and positioning the objects to optimally represent relational database associations. Techniques of the past have not been able to sufficiently improve the graphical display of a typically large number of objects that may be used with data analysis techniques such as data mining of relational database information or multidimensional data, and OLAP data.

The preferred embodiment of the present invention employs a technique that enables expansion of some objects that represent entities while also presenting other non-expanded objects within the graphical display in a manner that retains all or most of the contextual information. The preferred embodiment of the present invention may rely on a typical star schema layout of data entities that includes a facts object, typically containing a single facts table, in the center of the display surrounded by dimension objects. A star schema is a set of relational tables including multiple main tables, sometimes referred to as fact tables, and related dimension tables wherein the dimension tables intersect the main tables via common columns and wherein the dimension tables are each associated with a column in the main tables corresponding to each of the rows in the dimension tables. Because a star schema is simple, having few tables, it minimizes the complexity required to process database operations. This helps both to increase performance speed and to ensure correct results of database operations. Therefore many relational databases have been built in a star schema configuration to minimize database management overhead.

More particularly the star schema comprises fact tables, which are joined to one or more dimension tables according to specified relational or conditional operations. The fact tables hold measurement data, while the dimension tables hold attribute data. The dimension tables are usually joined to the fact tables with an equivalence condition.

The preferred embodiment of the present invention takes advantage of the star schema configuration to manage graphical display enlargement and movement of at least one object within a particular area when the object is expanded. That is, the affinity of objects in the same area is recognized and exploited by the preferred embodiment of the present invention that modifies objects that are contained in the area that includes an expanded object and that are therefore associated with the expanded object. The preferred embodiment of the present invention novelly represents the star schema configuration by areas that represent fact objects or dimensions, and an affinity between associated objects in the area is identified and represented in the graphical display.

The preferred embodiment of the present invention splits the graphical display into three areas: a left area, a center area, and a right area. The facts object is placed in the center area and the dimensions are distributed between the left area and the right area. It will be understood that the present invention may operate on a different number of areas, either less than or greater than three areas. When an object is expanded it causes the associated area to also expand, which causes the neighboring areas and their contents, such as objects, to adjust their position, typically by moving, to minimize distortion and to retain contextual information.

In the preferred embodiment of the present invention the point of origin of the graphical display is the upper left corner of the graphical display. Further and since the point of origin is the upper left corner, the objects contained in areas that are not expanded, and presumably not being analyzed, are moved to the right, and if necessary are moved out of the viewing area of the graphical display. It will be appreciated that the present invention may be embodied in a graphical display that represents greater than two dimensions. Therefore the movement may be in vertical, horizontal, or other directions.

Also, in one embodiment of the present invention that relies on the star schema configuration, the objects in the left area are right aligned and the objects in the right area are left aligned. The objects in the center area are center aligned. This helps optimize the representation of connecting lines in the graphical display that are used to illustrate associations between the facts objects and the dimension objects. That is, positional justification of objects to ensure that the objects are grouped toward the center of the graphical display reduces the instance of connecting lines crossing over other connecting lines.

An embodiment of the present invention is achieved by systems, methods, and computer products that improve the graphical display of a large number of objects that may be used with data analysis techniques such as data mining of relational database information, multidimensional data, and OLAP data. A method comprises: (a) identifying the entities in a collection of data, (b) mapping the entities to objects that are represented in a graphical display, (c) identifying the objects in at least one area; (d) associating the objects within each area together by techniques such as showing connecting lines that illustrate associations between objects; (e) as necessary and to respond to manipulation of an object within an area, minimizing display distortion and retaining contextual information by: (i) enlarging or reducing the size of the area, and moving and realigning the other objects within the same area, (ii) moving objects in other areas that have not been adjusted in size to accommodate change in the area containing the manipulated object, and (iii) adjusting the position of objects within other areas, both in the horizontal direction and in the vertical direction, to accommodate the new position of objects in the area that underwent a size change.

An embodiment of the present invention novelly divides the graphical presentation into areas and allows objects to be manipulated independently within each area. This provides added flexibility when attempting to present many objects concurrently. It will be appreciated that the operation of the present invention is not limited to a relational database, a multidimensional database, or OLAP applications but may be applied to any computer-based graphical presentation that includes a large number of objects. Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a block diagram that illustrates the computer systems that may implement the present invention;

FIG. 2 includes FIG. 2A and FIG. 2B;

FIG. 7 is a block diagram that illustrates contracting an area and adjustment of objects;

DETAILED DESCRIPTION OF THE INVENTION

Figure 2A:
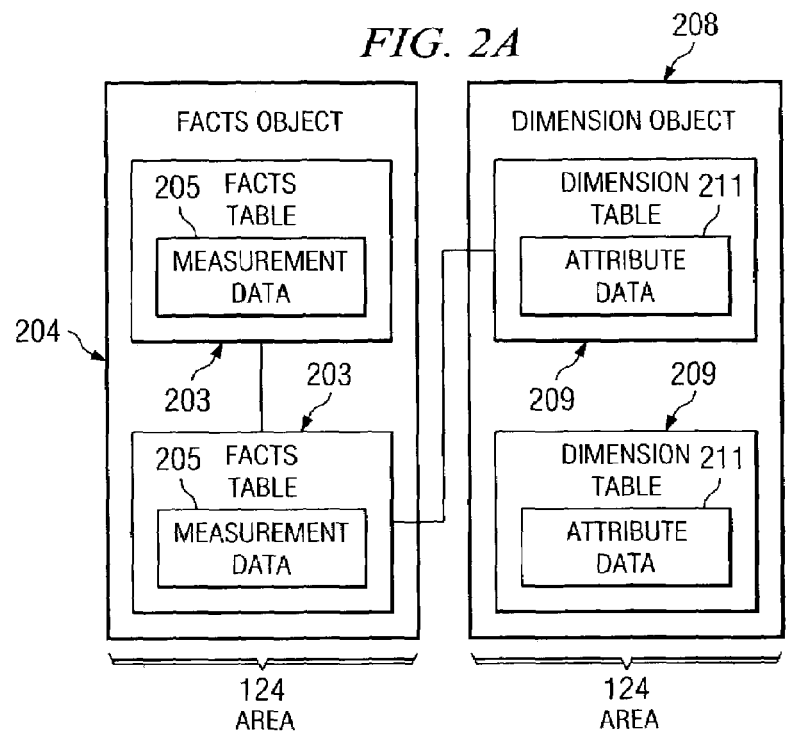
FIG. 2A is a block diagram that illustrates areas.

In the following detailed description and in the several figures of the drawings, like elements are identified with like reference numerals.

As shown in the drawings and for purposes of illustration, an embodiment of the invention efficiently presents typically large amounts of entity information with a graphical display that retains all or most of the relevant contextual information and minimizes distortion of the graphical display. Existing systems have not been able to sufficiently improve the graphical display of a typically large number of objects that represent data entities. The objects may be used with data analysis techniques such as data mining of relational database information, multidimensional data, and OLAP data. The present invention may be implemented with a graphical display having at least one area that includes objects. The present invention enables users to analyze large amounts of data represented as objects in the graphical display by partitioning the graphical presentation into areas and by allowing manipulation of objects within each area as a unit. That is, the objects are manipulated independently of objects in other areas. This provides added flexibility when attempting to present many objects concurrently. Further, an embodiment of the present invention enables efficient analysis of data represented in the graphical display by minimizing distortion of the text in the graphical display, retaining contextual information associated with data objects in the graphical display, and positioning the objects to optimally represent relational database associations.

FIG. 1 is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention. The object manager module 120 operates in the client computer system 102 or the server computer system 104 to perform the preferred embodiment of the present invention. For example, information may be communicated to either the server 104 or the client 102 via the user interface 117; and may subsequently be used by the object manager module 120 to display a typically large number of objects 126 while preserving the contextual information associated with the objects 126. The user interface 117 may communicate with the preferred embodiment of the present invention, either via batch input 119 or user input 118. Further, the database 110 may be configured in the memory 958 of the client 102 or the server 104. Alternatively the database 110 may be configured in computer storage such as that of a disk 122. Element 958 is described with reference to FIG. 9.

According to the preferred embodiment of the present invention the object manager module 120 operates by generating a graphical display 128 that preserves contextual information associated with a large number of objects 126 in at least one area 124. The preservation of contextual information advantageously enables a user to determine useful relationships between objects 126 that represent data entities 130. Data entities 130 may represent associations among things such as objects 126; and about which data 134 may be stored in a database 110, such as a multidimensional database 132. Therefore by the operation of the present invention users may manipulate and analyze a large number of objects 126 and see at a glance the relationship between the objects 126 and the associated data entity 130.

Figure 2B:
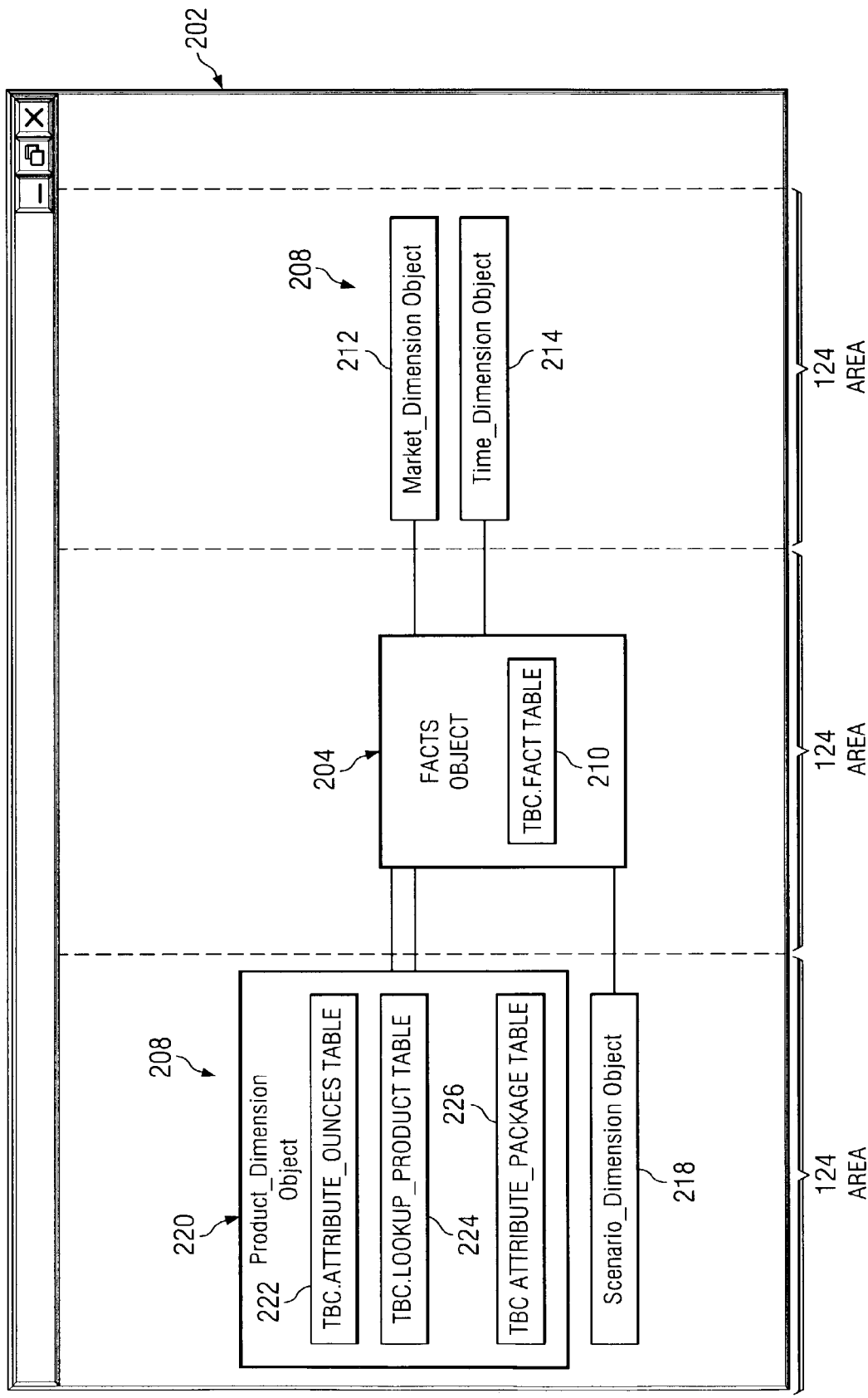
FIG. 2B is a block diagram that illustrates the star schema configuration used with an embodiment of the present invention.

FIG. 2 includes FIG. 2A and FIG. 2B. FIG. 2A is a block diagram that illustrates areas 124 that include the facts objects 204 and the dimension objects 208. Facts objects 204 may include facts tables 203, such as the one illustrated in FIG. 2A, that typically include measurement data 205. Dimension objects 208 may include dimension tables 209 that typically include attribute data 211. Relational database 110 operations, such as "join," may be performed on tables, such as facts tables 203 and dimension tables 209. The fact tables 203 hold measurement data 205 that is typically numerical data 134. The dimension tables 209, such as the one illustrated in FIG. 2A, hold attribute data 211 that may be either numerical or character format. Further, an area 124 is used in the preferred embodiment of the present invention to identify an affinity between associated objects 126 in the area 124. In a star schema configuration 202 the attribute data 211, such as specific information about product markets or product identification descriptors, that is a represented in a row in the dimension table 209 is used to identify columns in a facts table 203. Elements 110 and 134 are described with reference to FIG. 1, and element 202 is described with reference to FIG. 2B.

FIG. 2B is a block diagram that illustrates the star schema configuration 202. The preferred embodiment of the present invention expands some objects 126 that represent entities 130 while also presenting other non-expanded objects 126 within the graphical display 128. The preferred embodiment of the present invention may rely on a typical star schema 202 that includes a facts object 204 in the center of the display surrounded by dimension objects 208. The terms "star schema" and "star schema configuration" will be used interchangeably herein. Elements 126, 128, and 130 are described with reference to FIG. 1.

A star schema 202 is a named collection of objects 126. For example a star schema 202 may include a facts object 204 containing a facts table 203, such as the TBC.FACT Table 210. A dimension object 208, such as the Product_Dimension Object 220 may include specific dimension tables 209, such as TBC.ATTRIBUTE_OUNCES Table 222, TBC.LOOKUP_PRODUCT Table 224, and TBC.ATTRIBUTE_PACKAGE Table 226. Other dimension objects 208 included in the present example are Market_Dimension Object 212, Time_Dimension Object 214, and Scenario_Dimension Object 218. The dimension objects 208 intersect the facts object 204 via common columns and one dimension table 209 is associated with a column in the fact table 203 corresponding to each of the rows in the dimension tables 209. In the present example, the fact table 203 is joined to one or more dimension tables 209 according to specified relational or conditional operations. Element 134 is described with reference to FIG. 1, and elements 203 and 209 are described with reference to FIG. 2A.

A novel embodiment of the present invention takes advantage of the star schema configuration 202 to manage the enlargement of objects 126 in a particular area 124 within a graphical display 128. For example, an area 124 may include the Market_Dimension Object 212 and the Time_Dimension Object 214. The affinity of objects 126 in the same area 124 is recognized and exploited by an embodiment of the present invention that modifies objects 126 that are contained in the area 124 that includes an expanded object 126. Since the star schema configuration 202 may be represented by a series of areas 124, the preferred embodiment of the present invention illustrates affinity between associated objects 126 within a star schema configuration 202 by manipulating and modifying the graphical representation of objects 126 in areas 124.

Figure 3:
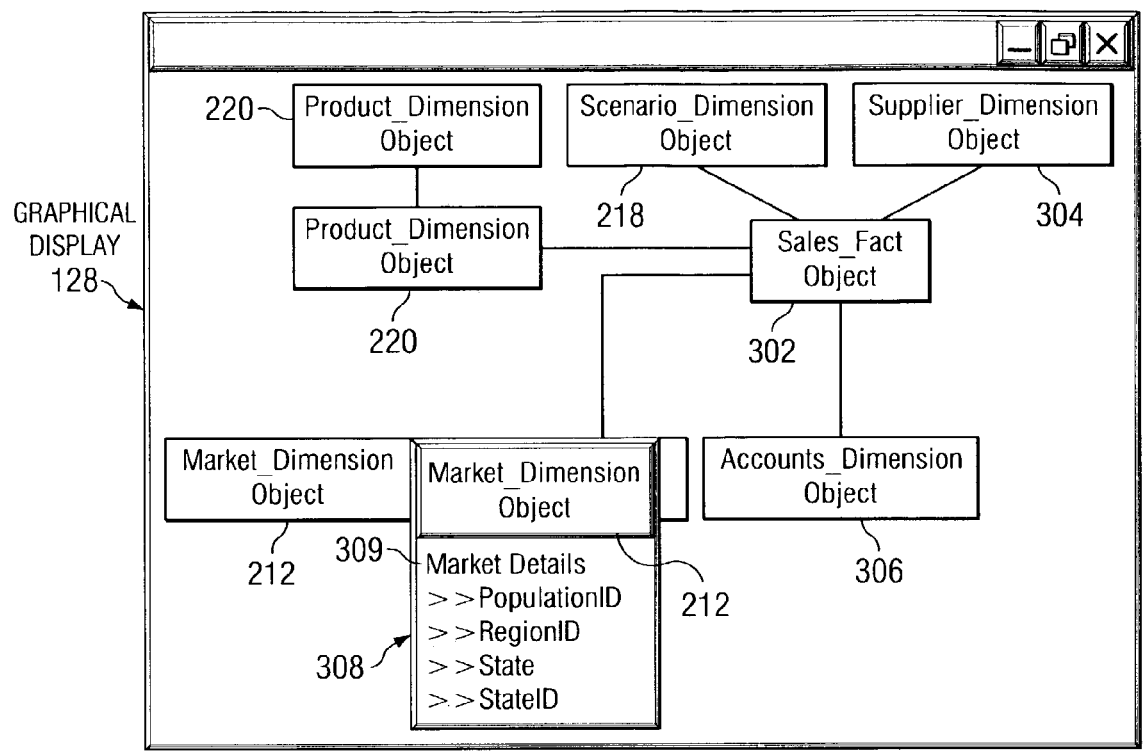
FIG. 3 is a block diagram that illustrates an area with a large number of objects.

FIG. 3 is a block diagram that illustrates a graphical display 128 with a large number of objects 126 and some of the problems of the past. In the past graphics tools have represented objects 126 with figures, such as rectangle displays. By further means of example, an object 126 may represent a data entity 130 such as a facts table 203 or a dimension table 209 in a relational database 110. An object 126 may alternatively represent OLAP data 134. The objects 126 are displayed so that they present such relationships. Given the large amount of OLAP data 134 associated with databases 110, such as multidimensional databases 132, there may be many objects 126 in the graphical representation 128. The problems caused by manipulation of objects 126 during analysis of the data entities 130 in the graphical display 128 include obscuring some of the objects 126, impairing legibility of some of the objects 126, and loosing the contextual reference of the objects 126. Elements 110, 124, 126, 130, 132, and 134 are described with reference to FIG. 1, and elements 203 and 209 are described with reference to FIG. 2.

In the present example, the following objects 126 are represented: Product_Dimension Object 220, Scenario_Dimension Object 218, Sales_Fact Object 302, Supplier_Dimension Object 304, Market_Dimension Object 212, and Accounts_Dimension Object 306. The difficulty associated with allowing the user to move objects 126 is that other objects 126 may be blocked by the recently moved object 126. For example as shown in element 308, the expanded Market_Dimension Object 212 is represented by information about the Market Details table 309. The expanded Market_Dimension Object 212 obscured another Market_Dimension Object 212, as shown in element 308. Even though enabling movement of objects 126 enhances the flexibility in the graphical display 128, the user must constantly reposition the objects 126 as they become blocked during expansion and minimization of other objects 126. This tends to reduce contextual information included in the graphical display 128. This also may require the user to iteratively expand and minimize objects 126 to recover the information about the contextual relationship of the moved objects 126.

Figure 4:
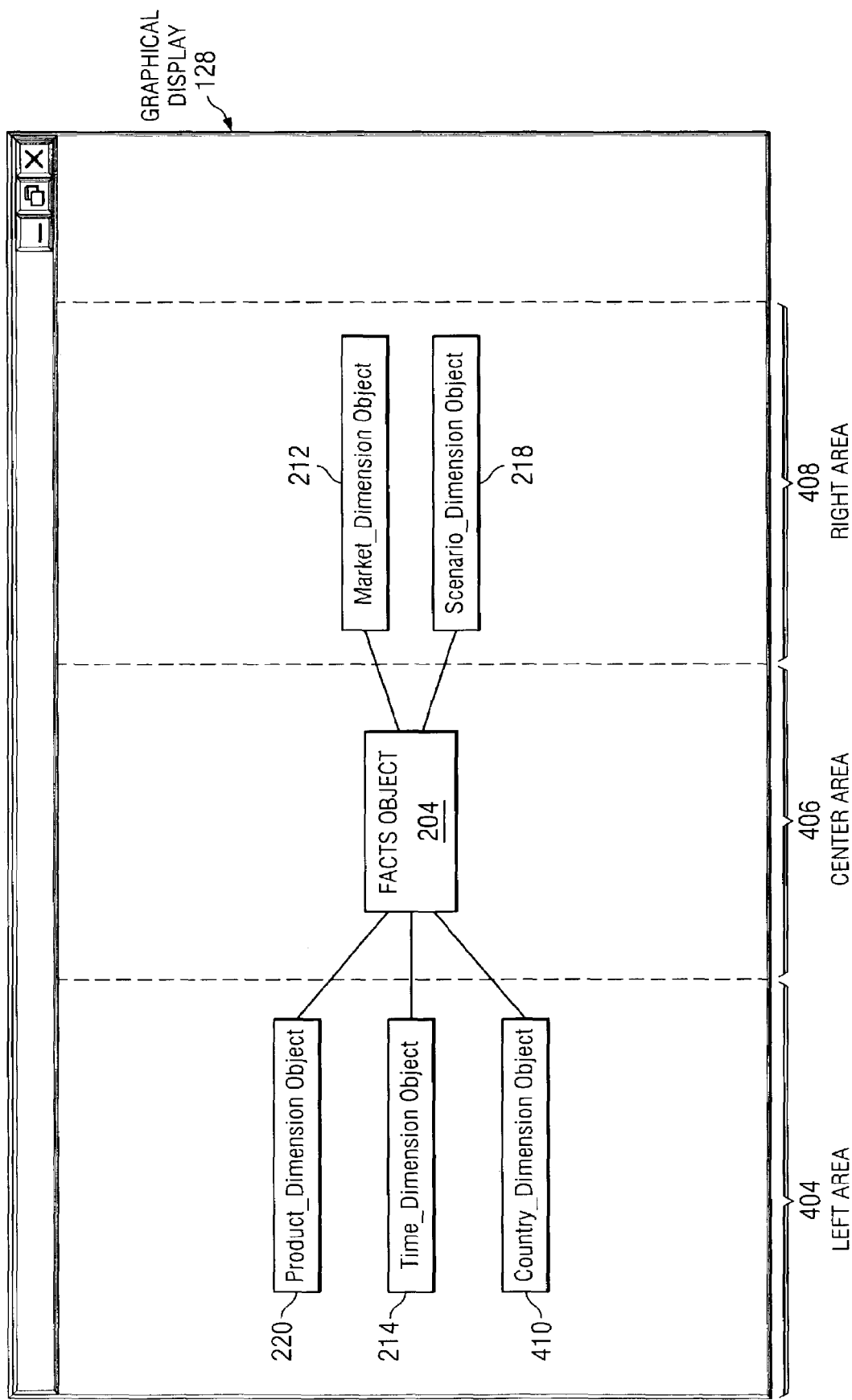
FIG. 4 is a block diagram that illustrates minimizing the objects throughout a graphical display.

FIG. 4 is a block diagram that illustrates minimizing the objects 126 throughout the graphical display 128. Since the objects 126 may be manipulated by techniques such as enlarging, minimizing, and moving, one approach of the past is to minimize the objects 126 throughout the graphical display 128 to facilitate analysis of typically large amounts of data 134 represented by the objects 126. In the present example, the following three areas 124 represent the partitioning of a large number of objects 126: the left area 404, the center area 406, and the right area 408. Elements 124, 126, and 134 are described with reference to FIG. 1.

Further, in the present example, the objects 126 in the left area 404 are: Product_Dimension Object 220, Time_Dimension Object 214, and Country_Dimension Object 410. The objects 126 in the right area 408 are: Market_Dimension Object 212 and Scenario_Dimension Object 218. The Facts Object 204 is represented in the center area 406. By means of example, data analysis is typically facilitated by scrolling the graphical display 128. During scrolling some of the objects 126 may not be visible to the user, thereby losing the contextual reference of those objects 126. Therefore, the objects 126 may be minimized to facilitate viewing of the objects 126 during scrolling or other data analysis techniques. However, the minimization of the objects 126 throughout the graphical display 128 may result in the text within the individual objects 126 being rendered too small to read so that the user must repeatedly zoom in to see details of the objects 126 and zoom out to view the contextual relationship of the objects 126. Therefore, the minimization of the objects 126 in the graphical display 128 may result in the indiscriminate reduction in the size of individual objects 126 and the loss of contextual information.

In the preferred embodiment of the invention, and as illustrated with reference to FIGS. 4-7, the point of origin 514 for movement of objects 126 is the upper left corner of the graphical display 128. It will be appreciated that another point of origin 514 could be used to practice the present invention without departing from the spirit of the invention. Further, it will be appreciated that the present invention may be embodied in a graphical display 128 that represents greater than two dimensions. Therefore the movement may be in vertical, horizontal, or other directions. Element 514 is described with reference to FIG. 5.

Figure 5:
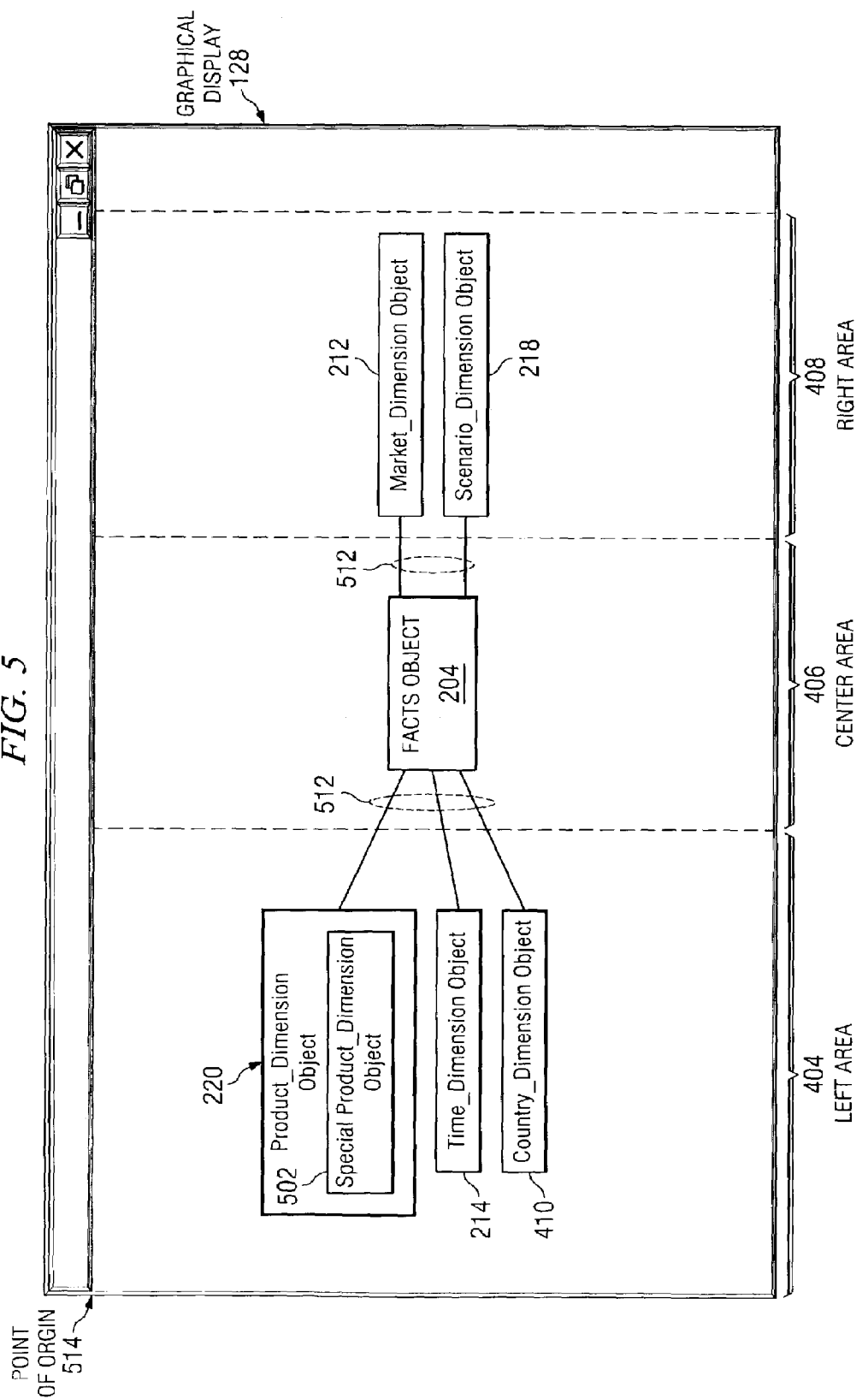
FIG. 5 is a block diagram that illustrates expanding an area.

FIG. 5 is a block diagram that illustrates the preferred embodiment of the present invention when expanding an area 124, such as the left area 404. The preferred embodiment of the present invention novelly splits the graphical display 128 into areas 124: a left area 404, a center area 406, and a right area 408. The facts object 204 is placed in the center area 406 and the dimension objects 208 are distributed between the left area 404 and the right area 408. While the present example represents a star schema configuration 202 with three areas 124, it will be understood that the present invention may operate on a different number of areas 124, either less than or greater than three areas 124. Element 124 is described with reference to FIG. 1, elements 202 and 208 are described with reference to FIG. 2.

Data analysis may be facilitated by operations such as scrolling, zooming, and moving objects 126 in a graphical display 128. Such operations may require enlarging and minimizing the objects 126. When an object 126 is enlarged the preferred embodiment of the present invention novelly recognizes that the associated objects 126 in the same area 124 will also be analyzed and therefore the preferred embodiment of the present invention modifies the associated objects 126 to facilitate such analysis. When an area 124 under analysis is enlarged, the operation of the present invention causes the position of neighboring areas 124 to be adjusted to preserve contextual information and minimize distortion of the objects 126, typically by moving the neighboring areas 124 to create more space on the graphical display 128 for the enlarged area 124. This retains much of the contextual information in the enlarged area 124 thereby enhancing the presentation of the data 134 for use in data analysis operations such as data mining. By means of further example, the center area 406 and the right area 408 are moved to the right in order to create more space for the newly enlarged left area 404. The right area 408 may be moved so far to the right that it is no longer contained in the viewing area of the graphical display 128. Since the objects 126 in the left area 404 are being analyzed and those in the right area 408 are not being analyzed, this advantageous repositioning of objects 126 facilitates data analysis. Elements 126, 128, and 134 are described with reference to FIG. 1.

For example, when the Product_Dimension Object 220 is enlarged, the associated left area 404 is enlarged. In the present example the following objects 126 in the left area 404 are also moved downwards to accommodate the newly enlarged Product_Dimension Object 220: Time_Dimension Object 214 and Country_Dimension Object 410. Also, the objects 126 in the center area 406 and the right area 408 are moved downward since they are vertically aligned within their areas 124 toward the center of the graphical display 128. That is, the new vertical movement of the objects 126 in the center area 406 and the right area 408 realigns these objects.

126 with the newly aligned objects 126 in the left area 404. By expanding and repositioning the representation of objects 126 in the left area 404, analysis of the objects 126 in the left area 404, which is presumably undergoing increased data analysis, is facilitated.

Also and in the preferred embodiment of the present invention the center area 406 and the right area 408 are moved to the right. The movement to the right accommodates the increase in the size of the left area 404. Further, since the point of origin 514 is the upper left corner and biasing objects 126 to the center of the graphical display 128 enables efficient representation of connection lines 512, the objects 126 in the left area 404 are right aligned. That is, since the preferred embodiment of the present invention operates with a star schema configuration 202, the justification of objects 126 within each area 124 that biases toward the center optimizes the placement of the objects 126 in the graphical display 128 for "join" representations associated with the star schema configuration 202 and illustrated herein by connecting lines 512. Therefore the rightward movement of each area 124 facilitates the right alignment of objects 126 in the left area 404. In the present example the objects 126 in the left area 404, such as the Time_Dimension Object 214 and the Country_Dimension Object 410, are moved to the right to maintain the alignment that facilitates representation of a star schema configuration 202. Also, in the present example the following objects are moved to the right: Facts Object 204, Market_Dimension Object 212, and Scenario_Dimension Object 218. Element 124 is described with reference to FIG. 1, and element 202 is described with reference to FIG. 2.

The present invention may operate in a recursive fashion, adjusting the size or position of an area 124 based on manipulating an object 126 contained within the area 124. The manipulated object 126 may be contained within another additional object 126 or area 124. Therefore, by means of example, when the Special_Product_Dimension Object 502 is manipulated, the position and size of the Product_Dimension Object 220 may be changed to accommodate the change to the Special_Product_Dimension Object 502. Changing the size or position of the Product_Dimension Object 220 may subsequently change the other areas 124 in the graphical display 128

Figure 6:
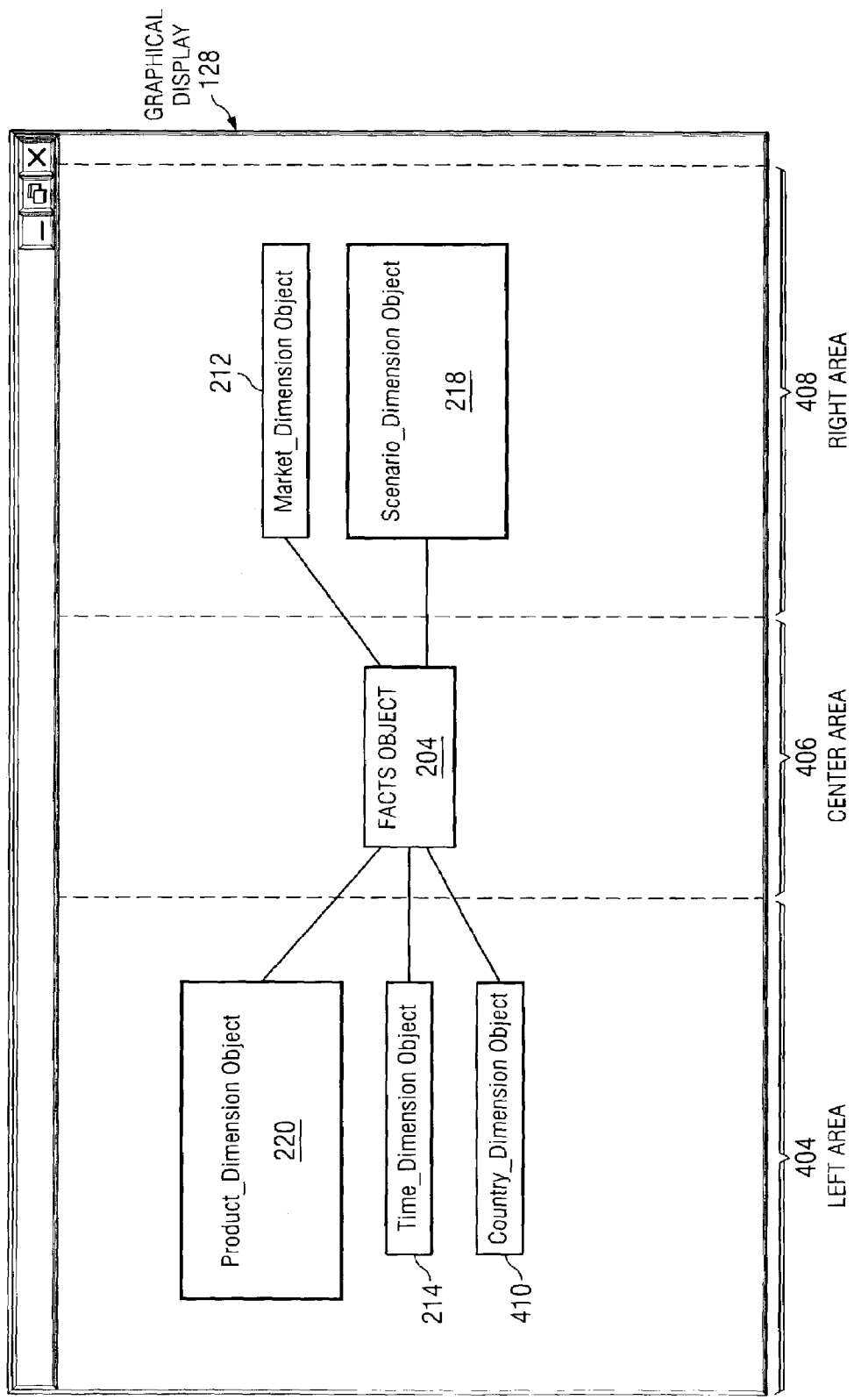
FIG. 6 is a block diagram that illustrates expanding an area and adjustment of objects.

FIG. 6 is a block diagram that illustrates expanding the right area 408, and aligning and adjusting the horizontal and vertical positions of the objects 126 within the graphical display 128. In this example, the left area 404 has already been expanded, as described with reference to FIG. 5. Therefore, when the Scenario_Dimension Object 218 that is contained in the right area 408 is expanded, the entire right area 408 is expanded.

As objects 126 in the right area 408 are expanded or reduced the associated area 408 is enlarged or reduced, and objects 126 within the area 408 are moved to ensure the proper justification with respect to horizontal position is maintained. In the preferred embodiment of the present invention the objects in the right area 408 are left justified, the objects 126 in the center area 406 are center justified, and the objects 126 in the left area 404 are right justified. Elements 124 and 126 are described with reference to FIG. 1.

Also, as objects 126 in the right area 408 are expanded the objects in the right area 408 are moved upwards or downwards to ensure proper vertical justification of the objects 126 in the graphical display 128. Therefore, in the present example, the Scenario_Dimension Object 218 is moved downward and the Market_Dimension Object 212 is moved upward.

The right area 408 may be adjusted on the graphical display 128 to accommodate newly expanded objects 126 within the right area 408. Therefore, the graphical display 128 includes an expanded view of both the right area 408 and the associated objects 126, and the left area 404 and the associated objects 126. The associated objects 126 of the left area 404 include: Product_Dimension Object 220, Time_Dimension Object 214, and Country_Dimension Object 410, and the center area 406 includes the facts object 204.

FIG. 7 is a block diagram that illustrates reducing the space allocated to the left area 404, and aligning and adjusting the position of objects 126 within the graphical display 128. Assuming that the left area 404 was previously expanded, as described with reference to FIG. 5, and that the Product_Dimension Object 220 has now been reduced in size, according to the preferred embodiment of the present invention the associated left area 404 will be adjusted to reflect the space required for adequate graphical display. Therefore by further means of example the left area 404 is reduced in size and the following associated objects 126 within the left area 404 that have not been expanded retain their previous size: Time_Dimension Object 214 and Country_Dimension 410. Element 126 is described with reference to FIG. 1.

Also, both the center area 406 and the right area 408 are moved to the left as a result of reducing the size of the left area 404. Further, the center area 406 that contains the Facts Object 204 remains minimized in size. Also, the right area 408 and the following associated objects 126 remain unchanged in size: Market_Dimension Object 212 and Scenario_Dimension Object 218.

FIG. 7 also illustrates the preferred embodiment of the present invention in which the objects 126 are vertically aligned and adjusted within the graphical display 128. Therefore, by means of explanation, since some of the objects 126 in the left area 404 have been reduced in size, and therefore vertical alignment of the objects 126 has been changed and the objects 126 in the left area 404 have been moved upwards. Now, to accommodate the new vertical position of the objects 126 in the left area 404, the objects in the center area 406 and the right area 408 are also move upwards. Therefore, in this instance, the Market_Dimension Object 212 and the Scenario_Dimension Object 218 have been moved upwards within the right area 408, and the Facts Object 204 has been moved upwards within the center area 406.

Figure 8:
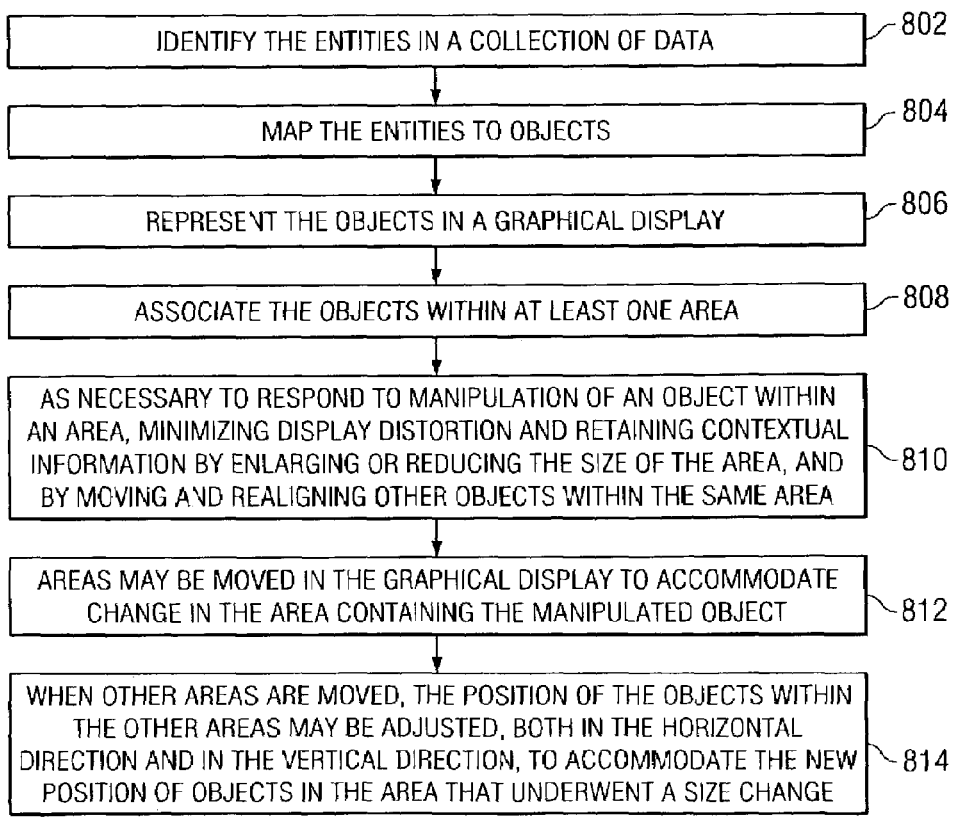
FIG. 8 is a flow diagram that illustrates the present invention.

FIG. 8 is a flow diagram that illustrates the present invention that improves the graphical display 128 of a large number of objects 126 that may be used with data analysis techniques such as data mining of relational database 10 information, multidimensional database 132 information, and OLAP data 134. Initially, as shown in element 802, the entities 130 in a collection of data 134 are identified. Then as shown in element 804 the entities 130 are mapped to objects 126. Next, as shown in element 806 the objects 126 are represented in the graphical display 128. According to a preferred embodiment of the present invention and as shown in element 808, the objects 126 are associated with at least one area 124. For instance, objects 126 in one area 124 may be associated with objects 126 in another area 124 by connecting lines 512. Then, as shown in element 810, as necessary to respond to manipulation of an object 126 within the area 124 other objects 126 within the same area 124 are manipulated by moving and aligning the objects 126 thereby minimizing graphical display distortion and retaining contextual information of the objects 126 within the area 124. Also, the area 124 may be reduced or enlarged in size to retain contextual information about the data 134 associated with the objects 126 in the area 124. Further and as shown in element 812, areas 124 may be moved in the graphical display 128 to accommodate change in the area 124 containing the manipulated object 126. As shown in element 814, when other areas 124 are moved, the position of the objects 126 within the other areas 124 may be adjusted, both in the horizontal direction and in the vertical direction, to accommodate the new position of objects 126 in the area 124 that underwent a size change. Elements 110, 124, 126, 128, 130, 132, and 134 are described with reference to FIG. 1, and element 512 is described with reference to FIG. 5.

Figure 9:
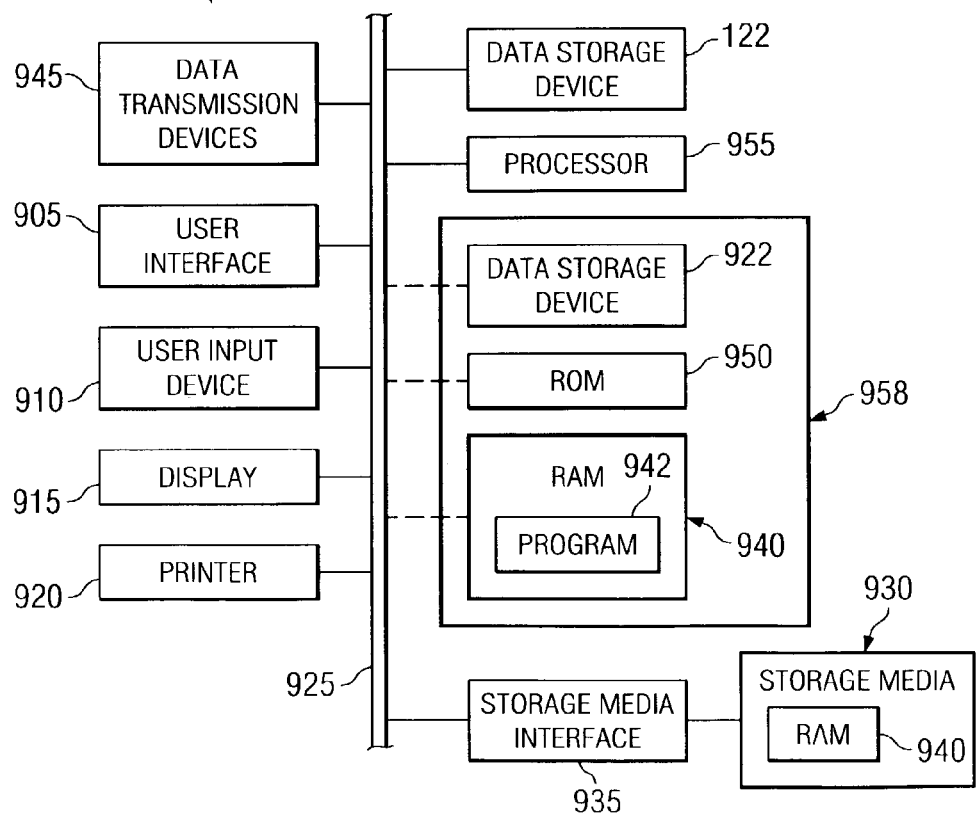
FIG. 9 is a block diagram of a computer system suitably configured for employment of the present invention.

FIG. 9 is a block diagram of a computer system 900, suitable for employment of the present invention. System 900 may be implemented on a general-purpose microcomputer, such as one of the members of the IBM Personal Computer family, or other conventional workstation or graphics computer devices. In its preferred embodiment, system 900 includes a user interface 905, a user input device 910, a display 915, a printer 920, a processor 955, a read only memory (ROM) 950, a data storage device 122, such as a hard drive, a random access memory (RAM) 940, and a storage media interface 935, all of which are coupled to a bus 925 or other communication means for communicating information. Although system 900 is represented herein as a standalone system, it is not limited to such, but instead can be part of a networked system. The computer system 900 may be connected locally or remotely to fixed or removable data storage devices 122 and data transmission devices 945. For example, the server computer system 104 and the client computer system 102 also could be connected to other computer systems 900 via the data transmission devices 945. Elements 102 and 104 are described with reference to FIG. 1.

The RAM 940, the data storage device 122 and the ROM 950, are memory components 958 that store data and instructions for controlling the operation of the processor 955, which may be configured as a single processor or as a plurality of processors. The processor 955 executes a program 942 to perform the methods of the present invention, as described herein.

While the program 942 is indicated as loaded into the RAM 940, it may be configured on a storage media 930 for subsequent loading into the data storage device 122, the ROM 950, or the RAM 940 via an appropriate storage media interface 935. Storage media 930 can be any conventional storage media such as a magnetic tape, an optical storage media, a compact disk, or a floppy disk. Alternatively, storage media 930 can be a random access memory 940, or other type of electronic storage, located on a remote storage system.

Generally, the computer programs and operating systems are all tangibly embodied in a computer usable device or medium, such as the memory 958, the data storage device 122, or the data transmission devices 945, thereby making an article of manufacture, such as a computer program product, according to the invention. As such, the terms "computer program product" as used herein are intended to encompass a computer program accessible from any computer usable device or medium.

Moreover, the computer programs 942 and operating systems are comprised of instructions which, when read and executed by the server computer system 104 and the client computer system 102, cause the server computer system 104 and the client computer system 102 to perform the steps necessary to implement and use the present invention. Under control of the operating system, the computer programs 942 may be loaded from the memory 958, the data storage device 122, or the data transmission devices 945 into the memories 958 of the server computer system 104 and the client computer system 102 for use during actual operations.

User interface 905 is an input device, such as a keyboard or speech recognition subsystem, for enabling a user to communicate information and command selections to the processor 955. The user can observe information generated by the system 900 via the display 915 or the printer 920. The user input device 910 is a device such as a mouse, track-ball, or joy stick that allows the user to manipulate a cursor on the display 915 for communicating additional information and command selections to the processor 955. Those skilled in the art will recognize many modifications may be made to this configuration without departing from the scope of the present invention.

When operating in accordance with one embodiment of the present invention, the system efficiently presents large amounts of entity 130 information within the graphical display 128 that retains all or most of the relevant contextual information. The processor 955 and the program 942 collectively operate as a module for fast and efficient presentation of a large amount of data 134 that enables efficient analysis of the data 134. Further the data 134 is presented via objects 126 in a graphical display 128 so that analysis of the data 134 is improved by minimizing distortion of the text in the graphical display 128, retaining contextual information associated with data objects in the graphical display 128, and positioning the objects 126 to optimally represent relational database associations. It will be appreciated that the present invention offers many advantages over prior art techniques. Elements 126, 128, 130, and 134 are described with reference to FIG. 1.

The present invention is typically implemented using one or more computer programs, each of which executes under the control of an operating system and causes the server computer system 104 and the client computer system 102 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM and DB2 are trademarks of International Business Machines Corporation in the United States, other countries, or both.

I claim:

1. A computer-implemented method, said computer including a processor and having a graphical display that includes at least one object that is associated with data, said method comprising:
   splitting said graphical display into a left area forming a left rectangle, a center area forming a center rectangle, and a right area forming a right rectangle;
   displaying a star schema in said graphical display by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;

accepting input that enlarges said at least one object in one area, wherein said at least one object is one of said dimension objects and facts objects; and in response to enlarging said at least one object in said one area:

enlarging said display of said one area that includes said enlarged at least one object;

realigning vertically and horizontally other objects within said enlarged area relative to said enlarged at least one object in said enlarged area;

moving said display of said each other area including at least one object that is not included in said enlarged area to create more space on the graphical display for said enlarged area, thereby enabling efficient analysis of said data associated with said at least one object that is included in said enlarged area; and realigning said objects in said each other area with the realigned other objects within said enlarged area, wherein positions of said objects in said each other area are adjusted in at least one of a horizontal direction and a vertical direction to accommodate alignment of said other objects within said each other area.

2. The computer-implemented method of claim 1 further comprising including vertical movement of said at least one object.

3. The computer-implemented method of claim 1 further comprising including horizontal movement of said at least one object.

4. The computer-implemented method of claim 1 further comprising:

including said at least one moved object in another area; and aligning said at least one moved object within said another area.

5. The computer-implemented method of claim 1 further comprising including at least one additional object that is associated with said data within said at least one object thereby enabling efficient analysis in a recursive manner of said data associated with said at least one additional object.

6. A computer-implemented method, said computer including a processor and having a graphical display that includes at least one object that is associated with data, said method comprising:

splitting said graphical display into a left area forming a left rectangle, a center area forming a center rectangle, and a right area forming a right rectangle;

displaying a star schema in said graphical display by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;

accepting input that reduces said at least one object in one area, wherein said at least one object is one of said dimension objects and facts objects; and in response to reducing said at least one object in said one area;

reducing said display of said one area that includes said reduced at least one object;

realigning vertically and horizontally other objects within said reduced area relative to said reduced at least one object in said reduced area;

moving said display of said each other area including at least one object that is not included in said reduced area in response to reduction of the display of said reduced area on the graphical device, thereby enabling efficient analysis of said data associated with said at least one object that is included in said reduced area; and realigning said objects in said each other area with the realigned other objects within said reduced area, wherein positions of said objects in said each other area are adjusted in at least one of a horizontal direction and a vertical direction to accommodate alignment of said other objects within said each other area.

7. The computer-implemented method of claim 6 further comprising including vertical movement of said at least one object.

8. The computer-implemented method of claim 6 further comprising including horizontal movement of said at least one object.

9. The computer-implemented method of claim 6 further comprising:

including said at least one moved object in another area; and aligning said at least one moved object within said another area.

10. The computer-implemented method of claim 6 further comprising including at least one additional object that is associated with said data within said at least one object thereby enabling efficient analysis in a recursive manner of said data associated with said at least one additional object.

11. A computer-implemented method, said computer including a processor and having a graphical display that includes at least two objects, said graphical display showing a relationship between said at least two objects, said method comprising:

splitting said graphical display into a left area forming a left rectangle, a center area forming a center rectangle, and a right area forming a right rectangle;

displaying a star schema in said graphical display by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;

displaying in at least one area said at least two objects in said graphical display;

accepting input that enlarges at least one of said at least two objects in one area; and in response to enlarging said at least one object in said one area;

enlarging said display of said one area that includes said enlarged at least one object;

moving and realigning vertically and horizontally at least one of said at least two objects that is not enlarged relative to said enlarged at least one object in said enlarged area thereby showing said relationship between said at least two objects;
moving said display of said each other area to create more space on the graphical display for said enlarged area;
realigning said objects in said each other area with the realigned other objects within said enlarged area, wherein positions of said objects in said each other area are adjusted in at least one of a horizontal direction and a vertical direction to accommodate movement and alignment of at least one of said at least two objects that is not enlarged; and
displaying said relationship on said graphical display by including at least one connecting line that connects said at least one object in said enlarged area with said at least one object that is not included in said enlarged area.

12. The computer-implemented method of claim 11, further comprising aligning said at least one moved object within said other area.

13. The computer-implemented method of claim 11, further comprising:
including at least one object in said graphical display that is not included in said enlarged area; and
moving said at least one object not included in said enlarged area, thereby retaining said displayed relationship of said at least two objects that are included in said enlarged area.

14. The computer-implemented method of claim 11, said computer having data and at least two entities that are collections of said data, the method further comprising representing said at least two entities with said at least two objects.

15. A computer-implemented method, said computer including a processor and having a graphical display that includes at least two objects, said graphical display showing a relationship between said at least two objects, said method comprising:
splitting said graphical display into a left area forming a left rectangle, a center area forming a center rectangle, and a right area forming a right rectangle;
displaying a star schema in said graphical display by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;
displaying in at least one area said at least two objects in said graphical display;
accepting input that reduces at least one of said at least two objects in one area; and
in response to reducing said at least one object in said one area;
reducing said display of said one area that includes said reduced at least one object;
moving and realigning vertically and horizontally at least one of said at least two objects that is not reduced relative to said reduced at least one object in said reduced area thereby showing said relationship between said at least two objects;
moving said display of said each other area in response to reduction of the display of said reduced area on the graphical device;
realigning said objects in said each other area with the realigned other objects within said reduced area, wherein positions of said objects in said each other area are adjusted in at least one of a horizontal direction and a vertical direction to accommodate movement and alignment of at least one of said at least two objects that is not reduced; and
displaying said relationship on said graphical display by including at least one connecting line that connects said at least one object in said reduced area with said at least one object that is not included in said reduced area.

16. The computer-implemented method of claim 15, further comprising aligning said at least one moved object within said other area.

17. The computer-implemented method of claim 15, further comprising:
including at least one object in said graphical display that is not included in said reduced area; and
moving said at least one object not included in said reduced area, thereby retaining said displayed relationship of said at least two objects that are included in said reduced area.

18. The computer-implemented method of claim 15, said computer having data and at least two entities that are collections of said data, the method further comprising representing said at least two entities with said at least two objects.

19. A computer system including a processor for enabling efficient analysis of data in said computer system, said computer system having a graphical display that includes at least one object that is associated with said data, said computer system comprising:
said graphical display is split into a left area forming a left rectangle, a center area forming a center rectangle, and a right area forming a right rectangle;
said graphical display displays a star schema by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;
an input device accepts input that enlarges said at least one object in one area, wherein said at least one object is one of said dimension objects and facts objects; and
in response to said at least one object in said one area being enlarged:
said display of said one area that includes said enlarged at least one object is enlarged;
other objects within said enlarged area are realigned vertically and horizontally relative to said enlarged at least one object in said enlarged area;
said display of said each other area including at least one object that is not included in said enlarged area is moved to create more space on the graphical display for said enlarged area, thereby enabling efficient analysis of said data associated with said at least one object that is included in said enlarged area; and
said objects in said each other area are realigned with the realigned other objects within said enlarged area, wherein positions of said objects in said each other area are adjusted in at least one of a horizontal direction and a vertical direction to accommodate alignment of said other objects within said each other area.

20. The computer system of claim 19 further comprising said at least one object that is vertically moved.

21. The computer system of claim 19 further comprising said at least one object that is horizontally moved.

22. The computer system of claim 19 further comprising:
   said at least one moved object is included in another area; and
   said at least one moved object is aligned within said another area.

23. The computer system of claim 19 further comprising:
   at least one additional object that is associated with said data; and
   said at least one additional object that is included in said at least one object thereby enabling efficient analysis in a recursive manner of said data associated with said at least one additional object.

24. A computer system including a processor for enabling efficient analysis of data in said computer system, said computer system having a graphical display that includes at least one object that is associated with said data, said computer system comprising:
   said graphical display is split into a left area forming a left rectangle, a center area forming a center rectangle, and a right area forming a right rectangle;
   said graphical display displays a star schema by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;
   an input device accepts input that reduces said at least one object in one area, wherein said at least one object is one of said dimension objects and facts objects; and
   in response to said at least one object in said one area being reduced:
      said display of said one area that includes said reduced at least one object is reduced;
      other objects are realigned vertically and horizontally within said reduced area relative to said reduced at least one object in said reduced area;
      said display of said each other area including at least one object that is not included in said reduced area is moved in response to reduction of the display of said reduced area on the graphical device, thereby enabling efficient analysis of said data associated with said at least one object that is included in said reduced area; and
      said objects in said each other area are realigned with the realigned other objects within said reduced area, wherein positions of said objects in said each other area are adjusted in at least one of a horizontal direction and a vertical direction to accommodate alignment of said other objects within said each other area.

25. The computer system of claim 24 further comprising said at least one object that is vertically moved.

26. The computer system of claim 24 further comprising said at least one object that is horizontally moved.

27. The computer system of claim 24 further comprising:
   said at least one moved object is included in another area; and
   said at least one moved object is aligned within said another area.

28. The computer system of claim 24 further comprising:
   at least one additional object that is associated with said data; and
   said at least one additional object that is included in said at least one object thereby enabling efficient analysis in a recursive manner of said data associated with said at least one additional object.

29. A computer system including a processor and having a graphical display that includes at least two objects, said graphical display showing a relationship between said at least two objects, said computer system comprising:
   said graphical display is split into a left area forming a left rectangle, a center area forming a center rectangle, and a right area forming a right rectangle;
   said graphical displays a star schema by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;
   said graphical display displays in at least one area said at least two objects;
   an input device accepts input that enlarges at least one of said at least two objects in one area; and
   in response to said at least one object in said one area being enlarged:
      said display of said one area that includes said enlarged at least one object is enlarged;
      at least one of said at least two objects that is not enlarged are moved and realigned vertically and horizontally relative to said enlarged at least one object in said enlarged area thereby showing said relationship between said at least two objects;
      said display of said each other area is moved to create more space on the graphical display for said enlarged area;
      said objects in said each other area are realigned with the realigned other objects within said enlarged area, wherein positions of said objects in said each other area are adjusted in at least one of a horizontal direction and a vertical direction to accommodate movement and alignment of at least one of said at least two objects that is not enlarged; and
      said graphical display displays said relationship by including at least one connecting line that connects said at least one object in said enlarged area with said at least one object that is not included in said enlarged area.

30. The computer system of claim 29, further comprising said at least one moved object that is aligned within said other area.

31. The computer system of claim 29, further comprising at least one object in said graphical display that is not included in said enlarged area and that is moved, thereby retaining said displayed relationship of said at least two objects that are included in said enlarged area.

32. The computer system of claim 29, said computer having data and at least two entities that are collections of said data, the computer system further comprising said at least two entities that are represented by said at least two objects.

33. A computer system including a processor and having a graphical display that includes at least two objects, said graphical display showing a relationship between said at least two objects, said computer system comprising:
- said graphical display is split into a left area forming a left rectangle, a center area forming a center rectangle, and a right area forming a right rectangle;
- said graphical display displays a star schema by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;
- said graphical display displays in at least one area said at least two objects;
- an input device accepts input that reduces at least one of said at least two objects in one area; and
- in response to said at least one object in said one area being reduced:
  - said display of said one area that includes said reduced at least one object is reduced;
  - at least one of said at least two objects that is not reduced is moved and realigned vertically and horizontally relative to said reduced at least one object in said reduced area thereby showing said relationship between said at least two objects;
  - said display of said each other area is moved in response to reduction of the display of said reduced area on the graphical device;
  - said objects in said each other area are realigned with the realigned other objects within said reduced area, wherein positions of said objects in said each other area are adjusted in at least one of a horizontal direction and a vertical direction to accommodate movement and alignment of at least one of said at least two objects that is not reduced; and
  - said graphical display displays said relationship by including at least one connecting line that connects said at least one object in said reduced area with said at least one object that is not included in said reduced area.

34. The computer system of claim 33, further comprising said at least one moved object that is aligned within said other area.

35. The computer system of claim 33, further comprising at least one object in said graphical display that is not included in said reduced area and that is moved, thereby retaining said displayed relationship of said at least two objects that are included in said reduced area.

36. The computer system of claim 33, said computer having data and at least two entities that are collections of said data, the computer system further comprising said at least two entities that are represented by said at least two objects.

37. An article of manufacture comprising a computer program usable medium storing instructions executable by a processor of a computer for enabling efficient analysis of data in said computer system, said computer having a graphical display that includes at least one object that is associated with said data, wherein said computer usable instructions when executed by the processor perform:
- splitting said graphical display into a left area forming a left rectangle, a center area forming a center rectangle, and a right area forming a right rectangle;
- displaying a star schema in said graphical display by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;
- accepting input that enlarges said at least one object in one area, wherein said at least one object is one of said dimension objects and facts objects; and
- in response to enlarging said at least one object in said one area:
  - enlarging said display of said one area that includes said enlarged at least one object;
  - realigning vertically and horizontally other objects within said enlarged area relative to said enlarged at least one object in said enlarged area;
  - moving said display of said each other area including at least one object that is not included in said enlarged area to create more space on the graphical display for said enlarged area, thereby enabling efficient analysis of said data associated with said at least one object that is included in said enlarged area; and
  - realigning said objects in said each other area with the realigned other objects within said enlarged area, wherein positions of said objects in said each other area are adjusted in at least one of a horizontal direction and a vertical direction to accommodate alignment of said other objects within said each other area.

38. The article of manufacture of claim 37 wherein said computer usable instructions when executed by the processor perform including vertical movement of said at least one object.

39. The article of manufacture of claim 37 wherein said computer usable instructions when executed by the processor perform including horizontal movement of said at least one object.

40. The article of manufacture of claim 37 wherein said computer usable instructions when executed by the processor perform:
- including said at least one moved object in another area; and
- aligning said at least one moved object within said another area.

41. The article of manufacture of claim 37 wherein said computer usable instructions when executed by the processor perform including at least one additional object that is associated with said data within said at least one object thereby enabling efficient analysis in a recursive manner of said data associated with said at least one additional object.

42. An article of manufacture comprising a computer program usable medium storing instructions executable by a processor of a computer for enabling efficient analysis of data in said computer system, said computer having a graphical display that includes at least one object that is associated with said data, wherein said computer usable instructions when executed by the processor perform:

splitting said graphical display into a left area forming a left rectangle, a center area forming a center rectangle, and a right area forming a right rectangle;

displaying a star schema in said graphical display by displaying dimension objects including dimension tables that include attribute data in said left area, a facts object including a facts table that includes measurement data in said center area, and additional dimension objects including dimension tables that include attribute data in said right area and by displaying connecting lines across said rectangles in the graphical display to illustrate associations between said facts object and said dimension objects, wherein said objects in each area are manipulated independently of said other objects in said each area and said objects in each other area;

accepting input that reduces said at least one object in one area, wherein said at least one object is one of said dimension objects and facts objects; and in response to reducing said at least one object in said one area:
  reducing said display of said one area that includes said reduced at least one object;
  realigning vertically and horizontally other objects within said reduced area relative to said reduced at least one object in said reduced area;
  moving said display of said each other area including at least one object that is not included in said reduced area in response to reduction of the display of said reduced area on the graphical device, thereby enabling efficient analysis of said data associated with said at least one object that is included in said reduced area; and
  realigning said objects in said each other area with the realigned other objects within said reduced area, wherein positions of said objects in said each other area are adjusted in at least one of a horizontal direction and a vertical direction to accommodate alignment of said other objects within said each other area.

43. The article of manufacture of claim 42 wherein said computer usable instructions when executed by the processor perform including vertical movement of said at least one object.

44. The article of manufacture of claim 42 wherein said computer usable instructions when executed by the processor perform including horizontal movement of said at least one object.

45. The article of manufacture of claim 42 wherein said computer usable instructions when executed by the processor perform:
  including said at least one moved object in another area; and
  aligning said at least one moved object within said another area.

46. The article of manufacture of claim 42 wherein said computer usable instructions when executed by the processor perform including at least one additional object that is associated with said data within said at least one object thereby enabling efficient analysis in a recursive manner of said data associated with said at least one additional object.

47. An article of manufacture comprising a computer program usable medium storing instructions executable by a processor of a computer, said computer having a graphical display that includes at least two objects, said graphical display showing a relationship between said at least two objects, wherein said computer usable instructions when executed by the processor perform:

splitting said graphical display into a left area forming a left rectangle, a center area forming a center rectangle, and a right area forming a right rectangle;

displaying a star schema in said graphical display by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;

displaying in at least one area said at least two objects in said graphical display;

accepting input that enlarges at least one of said at least two objects in one area; and in response to enlarging said at least one object in said one area:
  enlarging said display of said one area that includes said enlarged at least one object;
  moving and realigning vertically and horizontally at least one of said at least two objects that is not enlarged relative to said enlarged at least one object in said enlarged area thereby showing said relationship between said at least two objects;
  moving said display of said each other area to create more space on the graphical display for said enlarged area;
  realigning said objects in said each other area with the realigned other objects within said enlarged area, wherein positions of said objects in said each other area are adjusted in at least one of a horizontal direction and a vertical direction to accommodate movement and alignment of at least one of said at least two objects that is not enlarged; and
  displaying said relationship on said graphical display by including at least one connecting line that connects said at least one object in said enlarged area with said at least one object that is not included in said enlarged area.

48. The article of manufacture of claim 47, wherein said computer usable instructions when executed by the processor perform aligning said at least one moved object within said other area.

49. The article of manufacture of claim 47, wherein said computer usable instructions when executed by the processor perform:
  including at least one object in said graphical display that is not included in said enlarged area; and
  moving said at least one object not included in said enlarged area, thereby retaining said displayed relationship of said at least two objects that are included in said enlarged area.

50. The article of manufacture of claim 47, said computer having data and at least two entities that are collections of said data, wherein said computer usable instructions when executed by the processor perform representing said at least two entities with said at least two objects.

51. An article of manufacture comprising a computer program usable medium storing instructions executable by a processor of a computer, said computer having a graphical display that includes at least two objects, said graphical display showing a relationship between said at least two objects, wherein said computer usable instructions when executed by the processor perform:

splitting said graphical display into a left area forming a left rectangle, a center area forming a center rectangle, and a right area forming a right rectangle;

displaying a star schema in said graphical display by displaying at least one dimension object including at least one dimension table that includes attribute data in said left area, a facts object including a facts table that includes measurement data in said center area, and at least one additional dimension object including at least one dimension table that includes attribute data in said right area, wherein said at least one object in each area is manipulated independently of said other objects in said each area and said at least one object in each other area;

displaying in at least one area said at least two objects in said graphical display;

accepting input that reduces at least one of said at least two objects in one area; and in response to reducing said at least one object in said one area:

reducing said display of said one area that includes said reduced at least one object;

moving and realigning vertically and horizontally at least one of said at least two objects that is not reduced relative to said reduced at least one object in said reduced area thereby showing said relationship between said at least two objects;

moving said display of said each other area in response to reduction of the display of said reduced area on the graphical device;

realigning said objects in said each other area with the realigned other objects within said reduced area, wherein positions of said objects in said each other area are adjusted in at least one of a horizontal direction and a vertical direction to accommodate movement and alignment of at least one of said at least two objects that is not reduced; and displaying said relationship on said graphical display by including at least one connecting line that connects said at least one object in said reduced area with said at least one object that is not included in said reduced area.

52. The article of manufacture of claim 51, wherein said computer usable instructions when executed by the processor perform aligning said at least one moved object within said other area.

53. The article of manufacture of claim 51, wherein said computer usable instructions when executed by the processor perform:

including at least one object in said graphical display that is not included in said reduced area; and moving said at least one object not included in said reduced area, thereby retaining said displayed relationship of said at least two objects that are included in said reduced area.

54. The article of manufacture of claim 51, said computer having data and at least two entities that are collections of said data, wherein said computer usable instructions when executed by the processor perform representing said at least two entities with said at least two objects.

* * * * *